United States Patent [19]

Baril

[11] Patent Number: 5,547,334

[45] Date of Patent: Aug. 20, 1996

[54] METHOD OF FORMING A STACK OF BALES OF CROP MATERIAL

[75] Inventor: Albert F. Baril, Leola, Pa.

[73] Assignee: New Holland North America, Inc., New Holland, Pa.

[21] Appl. No.: 515,078

[22] Filed: Aug. 14, 1995

[51] Int. Cl.$^6$ ............................................ B65G 57/22
[52] U.S. Cl. .................. 414/786; 414/789.7; 414/789.8
[58] Field of Search ........................... 414/786, 789.7, 414/501, 789.2, 789.3, 789.4, 789.8

[56] References Cited

U.S. PATENT DOCUMENTS

| | | |
|---|---|---|
| 2,848,127 | 8/1958 | Grey . |
| 3,395,814 | 8/1968 | Grey . |
| 3,923,176 | 12/1975 | Wynn et al. . |
| 3,927,771 | 12/1975 | Butler et al. . |
| 3,942,651 | 3/1976 | Neely, Jr. . |
| 3,942,652 | 3/1976 | Butler et al. . |
| 3,945,507 | 3/1976 | Olsen et al. . |
| 4,088,231 | 5/1978 | Zipser et al. . |
| 4,203,695 | 5/1980 | Wynn et al. . |
| 4,204,792 | 5/1980 | Wynn et al. . |
| 4,273,488 | 6/1981 | Hill et al. . |
| 4,370,796 | 2/1983 | Wilson .................................. 29/564.3 |
| 4,832,553 | 5/1989 | Grey et al. ............................ 414/789.7 |

*Primary Examiner*—Karen B. Merritt
*Assistant Examiner*—Janice L. Krizek
*Attorney, Agent, or Firm*—Frank A. Seemar; Larry W. Miller

[57] ABSTRACT

An automatic bale wagon for forming a weather resistant block shaped stack from a plurality of similarly shaped bales as the bale wagon picks up and handles bales during traversal of a field in which a plurality of formed bales have been deposited. A first tier is formed by placing a plurality of bales within a generally rectangular configuration, and a tie tier is formed by placing a plurality of bales within a generally rectangular configuration similar in shape to the rectangular configuration of the first tier, the outermost of which bales in the tie tier not being in alignment with the bales in the first tier. The tie tier is positioned above the first tier. A tight top tier is then formed by placing a plurality of bales in a generally rectangular configuration similar in shape to the rectangular configuration of the tie tier. Adjacent ends and side surfaces of all bales in the top tier are contiguous, the outermost of which bales are not in alignment with the bales in the tie tier. The tight top tier is positioned above the tie tier whereby the contiguous relationship of the bales provides a barrier for resisting the entry of moisture via the top of the stack.

11 Claims, 2 Drawing Sheets

METHOD OF FORMING A STACK OF BALES OF CROP MATERIAL

FIELD OF THE INVENTION

The present invention relates generally to the art of forming a stack of bales of crop material, and more particularly, is concerned with an improved method of forming a weather-resistant, block-shaped stack consisting of several tiers of bales in a vertical array.

BACKGROUND OF THE INVENTION

Present day practices of bale handling involve the use of automated bale wagons to pick up a plurality of bales of crop material that have been deposited in a field, and forming them into a block shaped stack for storage on or adjacent the field or for transport to a remote location. One bale wagon of this type, which has achieved wide spread commercial acceptance, is the three table wagon illustrated and described in U.S. Pat. No. 2,848,127, issued on Aug. 19, 1958 in the name of Gordon E. Grey. Other bale wagons of the same general type utilizing varying approaches to the same problem are shown in U.S. Pat. Nos. 4,370,796, issued Feb. 1, 1983 in the name of Leon W. Wilson, No. 4,273,488, issued Jun. 16, 1981 in the name of Amos G. Hill et al, and No. 3,942,651, issued Mar. 9, 1976 in the name of Allen B. Neely, Jr.

The abovementioned Grey bale wagon has a first table for receiving bales from a bale loader or pickup assembly. The first table accumulates a predetermined number of bales, for example two, in a transverse row. An adjacent second table successively receives rows of bales from the first table and accumulates a plurality of such rows, for example four, five or six rows. This plurality of rows is commonly referred to as a tier of bales. The third table, or load bed, successively receives the tiers from the second table and accumulates a plurality of such tiers, for example seven, to form a stack of bales in a block shaped configuration. Once a stack of this nature has been formed on the third table, it may be either transported or unloaded. In the case of the latter, the load bed is pivoted to an upright position for depositing the stack on the ground with the first tier of bales that was formed on the second table becoming the lowermost tier in contact with the ground and the last formed tier being the uppermost or top tier of the stack.

In order to enhance the stability of stacks of bales, it is desirable to provide what is commonly referred to as tie tiers within the stack. A tie tier has individual bales selectively arranged to overlap two bales in adjacent tiers. Formation of a tie tier can be accomplished by pivoting certain bales through utilization of a mechanism of the type illustrated and described in U.S. Pat. No. 3,395,814, issued Aug. 6, 1968, also in the name of Gordon E. Grey. The general principle illustrated in this patent has been incorporated into present day commercial models of three table type bale wagons. Another example of a mechanism for forming a tie tier is shown in U.S. Pat. No. 3,942,652, issued Mar. 8, 1976 in the name of L. Dennis Butler, et al. Regardless of the mechanism, when bales are pivoted to provide different patterns in tie tiers, it is essential to maintain the periphery of the tier configuration as consistent as possible for the purposes of stack stability. Thus, even when the outer surfaces of the bales on the rectangular edge of the tier conform to the prescribed profile, there are internal spaces between the surfaces of adjacent bales as dictated by various tie patterns and varying bale dimensions.

Other improvements featured in three table bale wagons are illustrated by U.S. Pat. Nos. 3,927,771, issued Dec. 23, 1975 in the name of Lee D. Butler, et al, and No. 4,203,695, issued May 20, 1980 in the name of Edward J. Wynn, et al. In both patents bale wagons systems are shown that facilitate the automatic formation of block shaped stacks. More particularly, these patents disclose electronic and mechanical type control systems, respectively, whereby bales may be placed selectively on edge or flat on the second table to automatically configure tie patterns in the proper position as the stack is being formed. Electronic or mechanical memory systems are used to define a plurality of bale arrays representing various tier patterns, including tie tiers, as discussed above, as well as standard tiers in which the long dimension of all the bales in the tier are aligned.

Regardless of the system used, as mentioned above all tiers are commonly formed with all the outside surfaces of the bales in the tier aligned vertically with adjacent tiers in the final stack arrangement. One exception to this in the past has been the need to form a standard bottom tier without the twine being in contact with the ground, regardless of the position of the outer edges of the bales in the tier. This can result in the outside surfaces along one edge of the bottom tier being out of alignment with the surfaces of the next adjacent tier.

To keep the periphery of the tier configuration as consistent as possible is a desirable attribute as mentioned above. This is accomplished in some bale wagons by manipulating the bales on the first table as shown in U.S. Pat. No. 4,204,792, issued May 27, 1980 in the name of Edward J. Wynn, et al. It is also possible to transversely shift bales after they have been deposited on the second table as shown in U.S. Pat. No. 4,088,231, issued May 9, 1978 in the name of Randall E. Zipser, et al. Again, while accomplishing this consistent tier profile the resulting bale configuration creates internal spaces between the bales.

Consequently, even though stacks formed in the above manner accomplish desirable stability and appearance characteristics, there is an inherent disadvantage due to resulting internal spacing between bale surfaces yielding vertical voids in the stack. This problem caused during tier formation is compounded due to innate variations in bale length caused by fluxuating crop conditions, baler tolerances, etc. Such voids give rise ultimately to losses due to weather, i.e., inner bale surface areas adjacent spaces between bales in the stack become accessible to moisture which leads to spoilage.

SUMMARY OF THE INVENTION

Accordingly, a primary object of the present invention is to provide a method of forming a stable stack of bales in a manner that overcomes the above mentioned problem relating to spoilage.

In pursuance of this and other important objects the present invention provides for a method for automatically forming with a bale wagon a weather resistant block shaped stack from a plurality of similarly shaped bales as the bale wagon picks up and handles bales during traversal of a field in which a plurality of formed bales have been deposited, comprising the steps of forming a first tier by placing a plurality of bales within a generally rectangular configuration, forming a tie tier by placing a plurality of bales within a generally rectangular configuration similar in shape to the rectangular configuration of the first tier, the outermost of which bales in the tie tier not being in alignment with the bales in the first tier, positioning the tie tier above the first tier, forming a tight top tier by placing a plurality of bales in a generally rectangular configuration similar in shape to the rectangular configuration of the tie tier, and with adjacent ends and side surfaces of the bales being contiguous, the outermost of which bales are not in alignment with the bales in the tie tier, and positioning the tight top tier above the tie tier whereby the contiguous relationship of the bales provides a barrier for resisting the entry of moisture via the top of the stack.

The foregoing and other objects, features and advantages of the invention will appear more fully hereinafter from a consideration of the detailed description which follows, in conjunction with the accompanying sheets of drawings wherein one principal embodiment for carrying out the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
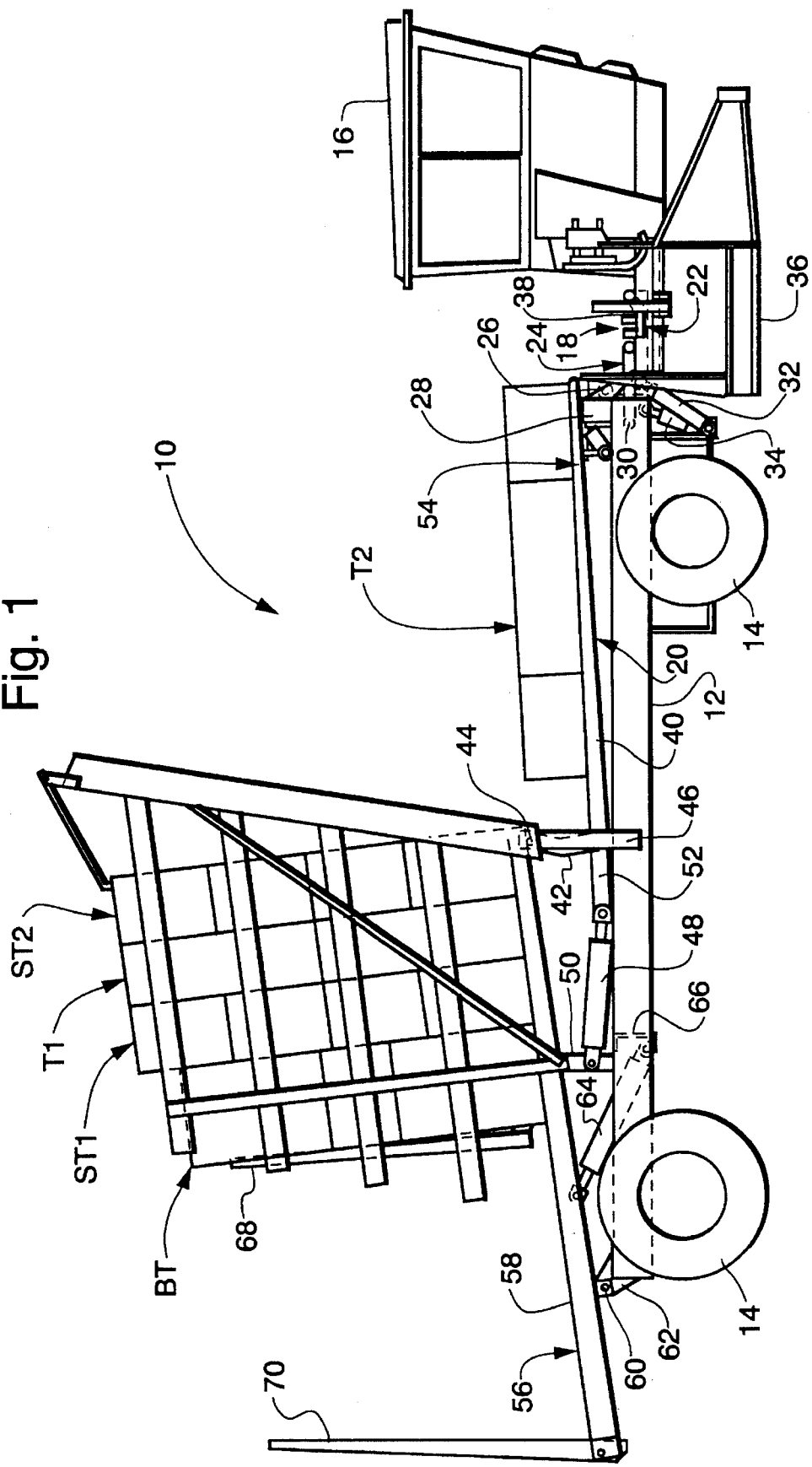
FIG. 1 is a side elevational view of a bale wagon in which the method steps of the present invention are readily carried out.
Figure 2:
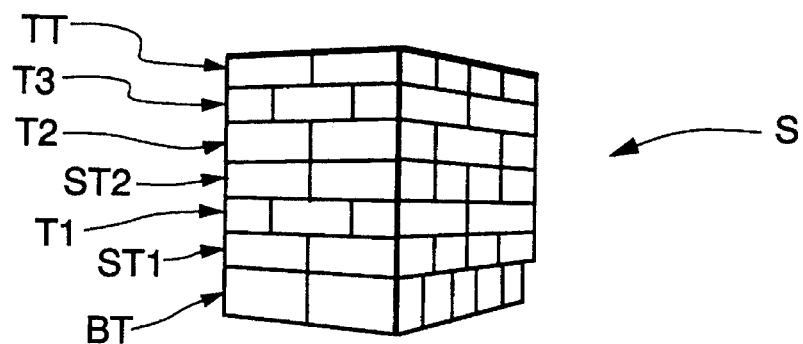
FIG. 2 is a diagrammatic perspective view of a typical standing block stack of bales after it has been deposited on the ground by a bale wagon of the type shown in FIG. 1.

Referring now to the drawings for a more detailed description of apparatus capable of carrying out the preferred embodiment of the present invention, FIG. 1 shows a bale wagon, generally designated by reference numeral 10, for forming a block shaped stack of bales S, as illustrated in FIG. 2.

Bale wagon 10 is provided with a mobile chassis formed of left and right longitudinally extending channels 12 (only the right channel being shown), suitably interconnected by spaced traverse channels (not shown), and front and rear pairs of wheels 14, only right wheels of each pair being shown in FIG. 1, for movably supporting the interconnected channels 12. On the forward ends of the channels 12 is mounted a cab 16 for housing the operator and various controls for the wagon. A source of power, such as an engine, is suitably mounted on the chassis for driving, preferably, the rear pair of wheels 14. Although the wagon illustrated is a self-propelled type, it could readily take the form of a pull-type wagon with the forward ends of the channels 12, instead of mounting the cab 16, converging in an assembly which would adapt the wagon to be secured to a tractor.

Mounted near the forward end of the mobile chassis, rearwardly of cab 16, and extending transversely thereto is means for receiving bales, generally indicated by the numeral 18 and hereinafter referred to as the first, bale-receiving table of wagon 10. The first table 18 is positioned adjacent and below a bale-supporting area defined by means hereinafter referred to as the second, tier-forming table of the wagon 10, generally indicated by the numeral 20.

The first table 18 includes first and second structures, generally designated 22, 24 respectively which receive and support the bales. The first structure 22 is pivotally secured at 26 between spaced-apart upstanding front brackets 28 (only the right one shown in FIG. 1) being mounted on longitudinal channels 12. The second structure 24 is pivotally secured at 30 between upstanding brackets 28 generally below, inwardly from, and rearwardly of, the pivotal securement for first structure 22 at 26. First and second hydraulic cylinders 32, 34 selectively operate structures 22,24 of the first table 18 in either one of two modes to lift bales received thereon on their flat sides upwardly and deposit the same on the bale-supporting area of the second table 20 on either the edge or flat sides of the bales. Since the construction of the first table 18 and the components for operating it in either one of its two modes are illustrated and described in U.S. Pat. No. 3,923,176 following the headings "Preferred Form of the Improved First Table" and "Two Modes of Operation of Improved First Table," such disclosure need not be repeated herein but instead is incorporated by reference. This patent issued to Edward J. Wynn et al on Dec. 2, 1975.

Bales are introduced to first table 18 by means of a bale loader or pickup, generally indicated at 36, which is mounted to the chassis at the right end of the table 18 and operative to lift bales, resting on one of their edge sides, from the ground and direct them through a generally 90 degree arcuate lateral path to the right receiving end of the table 18. The loader 36 is generally similar to the one illustrated and described in abovementioned U.S. Pat. No. 2,848,127. A cross conveyor 38, operatively mounted to the chassis, longitudinally extends along and above the bale supporting portions of first and second structures 22,24 of first table 18 from approximately the right receiving end to near the middle thereof for moving the bales laterally from the loader 36 toward the left end of first table 18. Cross conveyor 38 is generally similar to the one illustrated and described in the aforementioned U.S. patent.

The second, tier-forming table 20 is formed by an L-shaped structure having a forwardly extending leg portion 40 across which is defined the area which provides a surface upon which bales are supported and formed into a tier and an upwardly extending rear leg portion 42 which is pivotally secured at 44 between spaced apart upstanding brackets 46 (only the right one being shown in FIG. 1) mounted on longitudinal channels 12. A hydraulic cylinder 48 is pivotally secured at its anchor end to a frame member 50 mounted between longitudinal channels 12. The rod end of hydraulic cylinder 48 is pivotally secured to the free end of an arm portion 52 which is fixedly secured to, and extends rearwardly from, second table 20.

When second table 20 is in its normal horizontal tier-forming position, as shown in FIG. 1, it rests at its forward end on a transverse support member, not shown, fixed to front bracket 28. The requisite number of bales are accumulated and formed on second table 20 in a suitable manner into either a standard tier pattern or a tie tier pattern, i.e., a double rail or center rail tie tier, such patterns being illustrated in FIGS. 23 through 26 of U.S. Pat. No. 3,945,507, issued Mar. 23, 1976 in the name of James A. Olsen, et al, also incorporated by reference. Tier patterns are configured through utilization of a tie spike mechanism 54 similar to that disclosed in aforementioned U.S. Pat. No. 3,395,814, mounted to the transverse support member and positioned below second table 20. Subsequent to tier formation, hydraulic cylinder 48 is actuated so that it extends and causes table 20 to swing upwardly about pivot point 44 to a generally vertical position adjacent the front end of a rearwardly disposed load bed, or third table, being generally indicated by reference numeral 56. The tier of bales formed on second table 20 is then transferred to load bed 56.

Bed 56 includes a platform assembly 58 which is pivotally mounted at 60 between spaced apart upstanding rear brackets 62 (only the right one being shown in FIG. 1) mounted on longitudinal channels 12. A pair of spaced apart hydraulic cylinders 64 (only the right one being shown) are pivotally secured at their anchor ends to transverse frame member 66 fixed between channels 12 and at their rod ends to platform assembly 58. When load bed 56 is in its generally horizontal tier-receiving position, it rests at its forward end on upstanding brackets 46. A stack of bales is formed on load bed 56 upon successive delivery thereto of tiers of bales by pivotal movement of second table 20 from its normal horizontal tier-forming position of FIG. 1 to its generally upright position adjacent the forward end of load bed 56.

As the tiers of bales are delivered to load bed 56, a rolling rack 68 supports the rear of the stack being formed. Rolling rack 68 moves rearwardly along the load bed against residual holding pressure of a hydraulic cylinder. While rolling rack 68 is held by hydraulic pressure at the position to which it has been moved along load bed 56, the pressure of the rolling rack cylinder is overcome with the delivery of each successive tier of bales from second table 20 to the front end of load bed 56 whereby rolling rack 68 is urged rearwardly one bale width at a time until rack 68 reaches its rear position. A desired number of tiers for forming a selected stack configuration dictates the rear position of load bed 56. The structure and function of rolling rack 68, and its hydraulic cylinder are illustrated and described in detail in U.S. Pat. No. 3,927,771.

When load bed 56 has been loaded with a desired number of tiers, stack transfer is initiated by extension of hydraulic cylinders 64. This causes load bed 56 to pivot about point 60 from its generally horizontal position of FIG. 1 to an upright position in which rolling rack 68 and upright support tines 70 are disposed adjacent the ground. For the purposes of this description, the tiers of the partial stack being formed on bale wagon 10 (FIG. 1) are referenced to stack S in FIG. 2.

Now referring to FIGS. 2 through 4, an improved method of forming a stack of bales in accordance with the present invention will be described, based on the bale wagon structure described above. Stack S (FIG. 2) is a typical seven tier stack having a standard bottom tier BT, standard tiers ST1, ST2, tie tiers T1, T2, T3 and top tier TT. The configuration and formation of these tiers, explained throughout the prior art mentioned above, is well known. Although this particular stack configuration is used to illustrate the present invention, there are an extensive range of combinations based on bale size, stack size, crop conditions, bale wagon capabilities, etc., all of which would be compatible with the unique method related in detail below, with particular reference to top tier TT.

Figure 3:
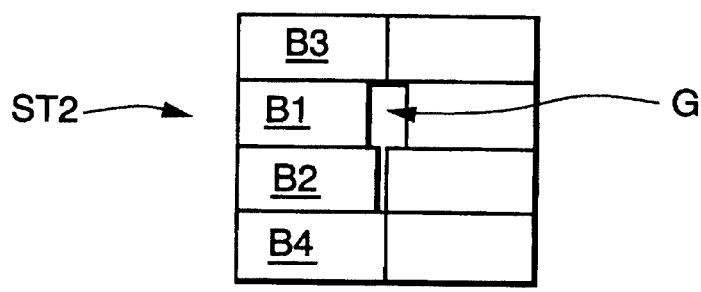
FIG. 3 is a diagrammatic view of an intermediate tier of bales in which both sides of the tier are even.

Top tier TT, shown in FIG. 2, is diagrammatically shown in plan view in FIG. 3 in a typical configuration. It, as in the case of any suitable standard tier, has bales positioned within a predetermined profile that conforms to the profile of adjacent tie tiers for stability and appearance. More particularly, by reversing the first table cross conveyor in a conventional manner during the programmed sequence of steps, bales B1 and B2 are repositioned with their right ends aligned with the right ends of bales B3 and B4. This provides a normal standard tier and leaves a gap G in the interior portion of the tier between the ends of bales which commonly have varying length dimensions, resulting in an area through which moisture can enter and dwell in the stack. In a like manner gaps are formed between bales in tie tiers, i.e., the bales are arranged to provide a predetermined profile without concern about resulting interior gaps.

Figure 4:
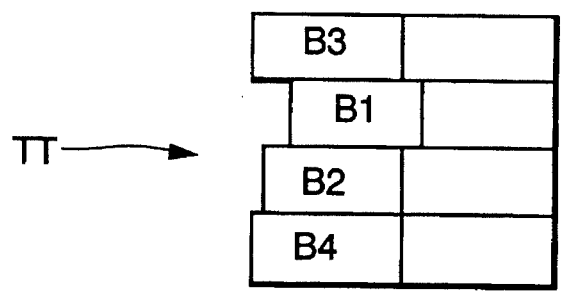
FIG. 4 is a diagrammatic view of a tight top tier of bales in the positions in which they are placed during the formation of a stack using the principles of the present invention.

Now turning to the tier configuration depicted in FIG. 4, regardless of the inconsistent length dimension, gap G (FIG. 3) has been eliminated. This top tier configuration is less appealing insofar as appearance is concerned but has no deleterious effect on stack stability in that there are no tiers supported thereon. Bale wagons are readily capable of making this configuration, however, in the past there has always been a desire, in fact a requisite, to configure standard tiers as shown in FIG. 3 for the reasons discussed above, i.e., stability and appearance. The method of the present invention requires, when forming a top tier, that there be no gaps. By utilizing the bale wagon of FIG. 1, and more particularly the first table, each row of bales in the last tier formed, i.e., the top tier, is programmed to leave all the bales in the leftmost position regardless of length, resulting in a random outline delineated by the right edges of the bales in the tier, one of which random outlines is shown in FIG. 4.

In summary, the most important advantages, explicit and implicit, of the method described herein is the formation of a weather resistant stack of bales in a simple and effective configuration by utilizing in a new and unique manner prior art stacking apparatus, one example of which is illustrated.

Thus, while preferred structure in which the principles of the present invention are readily carried out is shown and described above, it is to be understood that the invention is not to be limited to the particular apparatus shown and described above, but that, in fact, widely different means may be employed in the practice of the invention.

Having thus described the invention, what is claimed is:

1. A method for automatically forming with a bale wagon a weather-resistant, block-shaped stack of bales of crop material from a plurality of similarly shaped bales as the bale wagon picks up and handles bales during traversal of a field in which a plurality of formed bales have been deposited, comprising the steps of forming a first tier by placing a plurality of bales within a generally rectangular configuration, forming a tie tier by placing a plurality of bales within a generally rectangular configuration similar in shape to said rectangular configuration of said first tier, the outermost of which bales in said tie tier not being in alignment with the bales in said first tier, positioning said tie tier above said first tier, forming a tight top tier by placing a plurality of bales in a generally rectangular configuration similar in shape to said rectangular configuration of said tie tier, and with adjacent ends and side surfaces of said bales in said tight top tier being contiguous, the outermost of which bales in said tight top tier are not in alignment with the bales in said tie tier, and positioning said tight top tier above said tie tier whereby said contiguous relationship of said bales provides a barrier for resisting the entry of moisture into the stack via the top of the stack.

2. In a method as set forth in claim 1 wherein said generally rectangular configurations of said first tier, said tie tier and said tight top tier all have vertically aligned front and rear edges to enhance the stability of the stack.

3. In a method as set forth in claim 1 wherein said generally rectangular configurations of said first tier, said tie tier and said tight top tier all include at least one vertically aligned side edge.

4. In a method as set forth in claim 2 wherein said first tier and said tight top tier are standard tiers in which all bales therein are arranged with their long dimension in a side to side direction.

5. In a method as set forth in claim 4 wherein selected bales in said tie tier are arranged with their long dimension in a side to side direction and the remaining bales are arranged in a front to rear direction with adjacent sides and ends in spaced relationship to accommodate for the vertical alignment of said front and rear edges.

6. In a method as set forth in claim 3 wherein said first tier and said tight top tier are standard tiers in which all bales therein are arranged with their long dimension in a side to side direction, and said tie tier and said first tier include a second vertically aligned side edge.

7. In a method as set forth in claim 5 wherein selected bales in said tie tier are arranged with their long dimension in a side to side direction and the remaining bales are arranged in a front to rear direction with adjacent sides and ends in spaced relationship to accommodate for the alignment of said first and second edges.

8. In a method as set forth in claim 4 wherein the step of forming a tight top tier further comprises the step of placing a plurality of rows of bales in a side by side contiguous fashion.

9. In a method as set forth in claim 8 wherein the further step Of placing a plurality of rows results in a configuration whereby the profile of said tight top tier includes a side edge in which common ends of bales in all rows are linearly arranged and aligned with the corresponding edge of said tie tier.

10. In a method as set forth in claim 6 wherein the step of forming a tight top tier further comprises the step of placing a plurality of rows of bales in a side by side contiguous fashion.

11. In a method as set forth in claim 10 wherein the further step of placing a plurality of rows results in a configuration whereby the profile of said tight top tier includes a side edge in which common ends of bales in all rows are linearly arranged and aligned with the corresponding edge of said tie tier.

* * * * *